(12) United States Patent
Appleton et al.

(10) Patent No.: US 9,234,499 B2
(45) Date of Patent: Jan. 12, 2016

(54) COMPOSITE STRUCTURES

(75) Inventors: Steve Appleton, Fleet (GB); Knud Stenbaek Nielson, Skjern (DK)

(73) Assignee: QINETIQ LIMITED (GB)

( * ) Notice: Subject to any disclaimer, the term of this patent is extended or adjusted under 35 U.S.C. 154(b) by 996 days.

(21) Appl. No.: 13/265,289

(22) PCT Filed: Apr. 23, 2010

(86) PCT No.: PCT/GB2010/050668
§ 371 (c)(1),
(2), (4) Date: Jan. 9, 2012

(87) PCT Pub. No.: WO2010/122352
PCT Pub. Date: Oct. 28, 2010

(65) Prior Publication Data
US 2012/0107553 A1 May 3, 2012

(30) Foreign Application Priority Data
Apr. 23, 2009 (GB) .................. 0907010.3

(51) Int. Cl.
B32B 3/00 (2006.01)
F03D 1/06 (2006.01)
H01Q 17/00 (2006.01)

(52) U.S. Cl.
CPC ............. *F03D 1/065* (2013.01); *H01Q 17/00* (2013.01); *F05B 2260/99* (2013.01);
(Continued)

(58) Field of Classification Search
CPC ............. B32B 3/00; B32B 3/30; B32B 5/18; B32B 5/24; B32B 5/245; B32B 5/26; F03D 1/065; F05B 2260/99; F05B 2280/6003; F05C 2253/04; H01Q 17/00; H01Q 17/008; Y02E 10/721; Y02E 10/72; F01D 5/282

USPC ......... 428/156, 167, 172, 131, 136, 137, 138, 428/134, 158; 416/241 R, 229 R
See application file for complete search history.

(56) References Cited

U.S. PATENT DOCUMENTS 4,568,585 A * 2/1986 Kohn et al. .................... 428/48
5,041,323 A 8/1991 Rose et al.
(Continued)

FOREIGN PATENT DOCUMENTS

DE 199 55 007 5/2001
EP 1 267 324 12/2002
(Continued)

OTHER PUBLICATIONS

Robert Mirams; Combined Search and Examination Report issued in related Great Britain Application No. GB0907009.5; Oct. 27, 2007; 7 pages; Great Britain Intellectual Property Office.
(Continued)

*Primary Examiner* — Catherine A Simone
(74) *Attorney, Agent, or Firm* — McDonnell Boehnen Hulbert & Berghoff LLP

(57) ABSTRACT

A split core for a composite structure is described. The split core includes a first core layer, a second core layer, and a functional interlayer disposed between the first and second core layers. The first core layer separates the functional interlayer from a functional layer of the composite structure and/or from an outer surface of the composite structure. The thickness of the first core layer is substantially uniform across the composite structure and the distance between the functional interlayer and the functional layer and/or the outer surface of the composite structure is substantially constant across the composite structure.

13 Claims, 4 Drawing Sheets

(52) U.S. Cl.
CPC .... *F05B 2280/6003* (2013.01); *F05C 2253/04* (2013.01); *Y02E 10/721* (2013.01); *Y10T 428/2495* (2015.01); *Y10T 428/24314* (2015.01); *Y10T 428/24612* (2015.01); *Y10T 428/31504* (2013.01)

(56) References Cited

U.S. PATENT DOCUMENTS

| | | | |
|---|---|---|---|
| 5,232,762 | A | 8/1993 | Ruby |
| 5,460,864 | A | 10/1995 | Heitkamp |
| 5,474,837 | A | 12/1995 | Duke, Jr. et al. |
| 6,203,656 | B1 | 3/2001 | Syed |
| 6,969,548 | B1 | 11/2005 | Goldfine |
| 2003/0207075 | A1 | 11/2003 | Maignan et al. |
| 2004/0076800 | A1 | 4/2004 | Noilhan |
| 2004/0128948 | A1 | 7/2004 | Killen |
| 2007/0000091 | A1 | 1/2007 | Priegelmeir et al. |
| 2007/0128025 | A1 | 6/2007 | Driver |
| 2007/0148409 | A1* | 6/2007 | Rios et al. ............ 428/167 |
| 2007/0254140 | A1 | 11/2007 | Zou |

FOREIGN PATENT DOCUMENTS

| | | |
|---|---|---|
| EP | 1 447 337 | 8/2004 |
| EP | 1 808 290 | 7/2007 |
| WO | 93/23893 | 11/1993 |
| WO | 96/38025 | 11/1996 |
| WO | 98/10216 | 3/1998 |
| WO | 99/04966 | 2/1999 |
| WO | 2006/010342 | 2/2006 |
| WO | 2007/093285 | 8/2007 |
| WO | 2009/140949 | 11/2009 |

OTHER PUBLICATIONS

Monica Lozza; International Search Report and Written Opinion issued in related International Application No. PCT/GB2010/050667; Nov. 23, 2010; 14 pages; European Patent Office.

Monica Lozza; International Preliminary Report on Patentability issued in related International Application No. PCT/GB2010/050667; Aug. 11, 2011; 11 pages; European Patent Office.

Stephen G. Appleton; Design & Manufacture or Radar Absorbing Wind Turbine Blades—Final Report; Feb. 2005, 62 pages.

Karel Matous et al.; Optimization of Electromagnetic Absorption in Laminated Composite Plates; May 2003; 10 pages.

C. Mitrano et al.; CFRP-based broad-band radar absorbing materials; undated; 6 pages.

Ki-Yeon Park et al.; Fabrication and electromagnetic characteristics of electromagnetic wave absorbing sandwich structures; 2006; 10 pages; Composites Science and Technology.

Matt Bryanton et al.; Stealth Technology for Wind Turbines; Dec. 2007; 88 pages; Department of Business Enterprise & Regulatory Reform.

J. Pinto et al.; Radar Signature Reduction of Wind Turbines through the Application of Stealth Technology; undated; 6 pages; Essex, UK.

Robert Mirams; Combined Search and Examination Report issued in priority Great Britain Application No. GB0907010.3; Oct. 27, 2009; 6 pages; Great Britain Intellectual Property Office.

David Hutton; International Search Report and Written Opinion issued in priority International Application No. PCT/GB2010/050668; Apr. 19, 2011; 14 pages; European Patent Office.

Athina Nickitas-Etienne; International Preliminary Report on Patentability issued in priority International Patent Application No. PCT/GB2010/050668; Oct. 25, 2011; 10 pages; The International Bureau of WIPO.

* cited by examiner

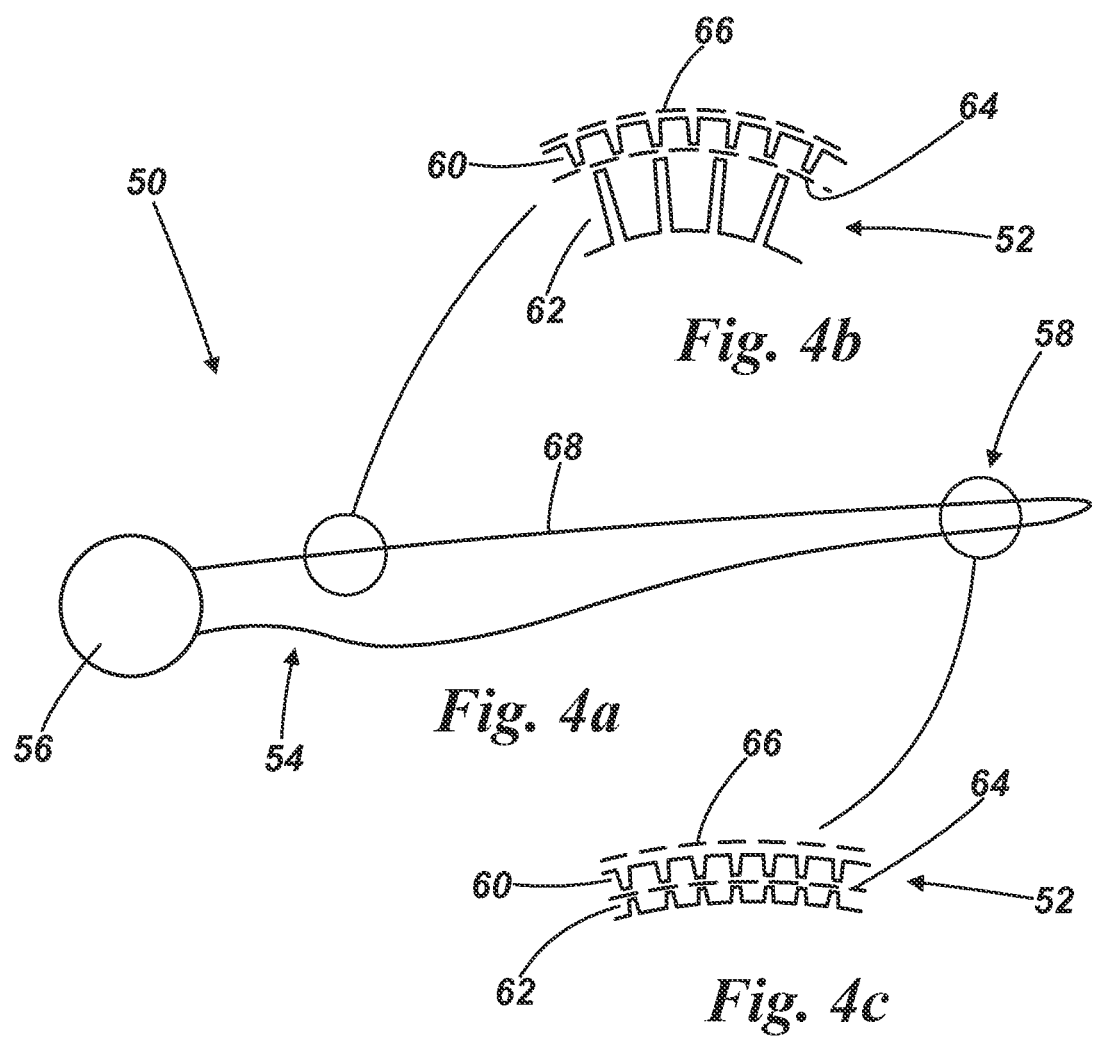

COMPOSITE STRUCTURES

FIELD OF THE INVENTION

The present invention relates to core materials used in the construction of composite structures such as wind turbine blades. In particular, the present invention relates to core materials adapted to drape in order to conform to the curvature of such composite structures, and to composite structures incorporating such core materials.

BACKGROUND

Existing wind turbine blades are generally manufactured from reinforced composite materials. A typical blade is fabricated in two shells, which are subsequently united to form a single unit. The shells include at particular location sandwich panel regions having a core of lightweight material such as foam or balsa wood.

Different regions of a wind turbine blade are subject to different forces. Consequently, the thickness of the core generally varies across the blade for structural reasons. Typically, the core thickness ranges from 5 mm to 45 mm.

A prior art core 10 is shown schematically in FIG. 1a. Referring to FIG. 1a, the core 10 includes several parallel slits 12, which facilitate draping of the core 10 so that the core 10 may conform to the curvature of the blade shell, as shown schematically in FIG. 1b. Different regions of a blade have different curvatures. Consequently, the core 10 may be required to drape to different extents in different regions of the blade.

It is desirable to introduce radar absorbing material (RAM) into the composite structure of blades. One reason for this is that rotating blades have a radar signature similar to that of aircraft, which can make it difficult for air traffic control and other radar operators to distinguish between aircraft and wind turbines. Incorporating RAM into blades ensures that the resulting blades have a reduced radar signature that can be distinguished easily from aircraft, and which creates less unwanted events (also known as "clutter") on the screen of the radar operator.

FIG. 1b shows a known technique for incorporating RAM into a blade. Referring to FIG. 1b, a blade 14 includes a radar absorbing layer 16 close to its outer surface. The drapable core 10 of FIG. 1a is provided inboard of the radar absorbing layer 16, and a radar reflecting layer 18 is disposed beneath the core 10. The RAM may be a "circuit analogue" (CA) absorber in which the radar absorbing layer 16 comprises a circuit provided on a suitable substrate, for example a glass-fibre cloth, and the radar reflecting layer 18 may suitably comprise a carbon cloth.

The separation between the radar absorbing layer 16 and the radar reflecting layer 18 is a key parameter for absorption performance, and must be carefully controlled to achieve a blade having the desired absorption properties. Such careful control of the separation of layers is made more difficult by varying geometry of the blade, specifically the abovementioned variation in core thickness.

SUMMARY OF THE INVENTION

According to a first aspect of the present invention, there is provided a composite structure comprising a functional layer and a core, the core comprising: a first core layer; a second core layer; and a functional interlayer disposed between the first and second core layers; wherein the first core layer is disposed between the functional layer and the functional interlayer; the thickness of the first core layer is substantially uniform across the composite structure; and the distance between the functional layer and the functional interlayer is substantially constant across the composite structure.

Hence, the invention resides in a split core arrangement in which the thickness of the core is divided between first and second core layers disposed about a functional interlayer.

Also in accordance with the first aspect of the invention, there is provided a composite structure comprising an outer surface and a core, the core comprising: a first core layer; a second core layer; and a functional interlayer disposed between the first and second core layers; wherein the first core layer is disposed between the outer surface and the functional interlayer; the thickness of the first core layer is substantially uniform across the composite structure; and the depth of the functional interlayer with respect to the outer surface is substantially constant across the composite structure.

The composite structure may be of sandwich panel construction, in which the core is the sandwich panel core. In examples of the invention described herein, the composite structure forms part of a wind turbine blade. However, it will be readily apparent that the present invention is not only applicable to wind turbine blades, but may also be applicable to any composite structure in which it is desirable to maintain a functional layer at a substantially constant distance from another functional layer or at a substantially constant depth with respect to an outer surface the composite structure.

If RAM is incorporated into the composite structure, the functional interlayer may comprise a RAM reflecting layer, for example a layer of carbon tissue. In addition, the functional layer of the composite structure may be, or comprise, a RAM absorbing layer. The RAM absorbing layer may be located close to the external surface of the composite structure. The RAM absorbing layer and the RAM reflecting layer are separated by a substantially constant distance by virtue of the first core layer of substantially uniform thickness. This ensures consistent RAM performance.

The total thickness of the core can be varied by varying the thickness of the second core layer without varying the thickness of the first core layer. Accordingly, the thickness of the second core layer may vary across the composite structure to vary the overall thickness of the core. As the thickness of the first core layer remains the same for all core thicknesses, consistent radar absorption performance can be achieved across an entire composite structure. Furthermore RAM design is less constrained by pre-determined core thicknesses. Functionality is improved because the split core design has consistent RAM performance across all core thicknesses.

The core layers are preferably formed from a lightweight material. Suitable materials include open or closed cell structured foam, syntactic foam, balsa wood and composite honeycomb. The core is preferably of unitary construction. Preferably the core is prefabricated such that the functional interlayer is embedded within the core prior to fabrication of the composite structure. The core may be used in prepreg or resin infusion moulding, or in other compatible moulding schemes. For application in a wind turbine blade, the thickness of the first core layer is typically in the range of 10 to 15 mm and the thickness of the second core layer is typically in the range of 5 to 35 mm. These thicknesses are suitable for absorbing aviation radar signals in the 1 to 3 gigahertz (GHz) range. However, it will be appreciated that different thicknesses may be required in order to absorb higher or lower frequencies.

The RAM absorbing layer may comprise a cloth substrate carrying a circuit which may be provided using conductive materials using known deposition techniques. The cloth may be woven from glass or other suitable reinforcing fibres. Preferably the cloth has a low-movement weave so that fibre movement, which may lead to breaking of the circuit elements, is minimised. Plain weave is an example of a low-movement weave. In examples of the invention described later, the cloth is plain weave E-glass.

As aforesaid, the composite structure may be a wind turbine blade. Accordingly, the inventive concept includes a wind turbine having such a blade, and a wind farm comprising one or more such wind turbines.

The inventive concept also includes a wind turbine blade of sandwich panel construction, in which a core of the sandwich panel comprises: first and second core layers; and a radar reflecting layer disposed between the first and second core layers; wherein the thickness of the first core layer is substantially uniform across the wind turbine blade, such that the radar reflecting layer is maintained at a substantially constant distance from a radar absorbing layer of the wind turbine blade. The thickness of the second core layer may vary across the blade to vary the overall thickness of the core. The radar absorbing layer may have the same design across regions of the blade of varying core thickness. Furthermore, again, the inventive concept includes a wind turbine having such a blade or a wind farm comprising at least one such wind turbine.

It may be desirable to embed other functionality within the core. Whilst it would be possible to have two or more types of functionality at different locations in the core, it is desirable to have the functionality in the same location. For example, optical fibres may be included between the two core layers, either instead of or in addition to a RAM reflecting layer. In the context of wind turbine blades, the optical fibres may be utilised in measuring loads experienced at various locations in the blades. Conveniently, any embedded functionality is protected by the first and second core layers.

Also in accordance with the first aspect of the invention, there is provided a core for a composite structure, the core comprising: a first core layer; a second core layer; and a functional interlayer disposed between the first and second core layers; wherein the first and second core layers and the functional interlayer are bonded together as a unitary core material; and the first core layer is of uniform thickness across the core. It will be appreciated that other preferred and/or optional features described above in relation to the composite structures are also applicable to this core, but for reasons of conciseness have not been repeated. For example: a RAM reflecting layer and/or optical fibres may be embedded in the core, and the thickness of the second core layer may vary across the core to vary the overall core thickness and hence to suit the structural requirements of a composite structure such as a wind turbine blade.

Curved composite structures such as wind turbine blades are fabricated on a mould that has a curved surface corresponding to the required curvature of the structure. Depending on the required curvature of the structure, the surface of the mould may have regions of concave and/or convex curvature. During lay-up of the curved structure, the cores are laid in the mould together with the other layers making up the structure. The cores must be sufficiently flexible so that they can drape in order to conform to the curvature of the mould, and hence the curvature of the resulting structure. To this end, the cores described above may be suitably adapted to facilitate draping as described in more detail below in relation to a second aspect of the invention.

It is important that any functionality incorporated in the interlayer region remains intact during manufacture of the core, during fabrication of the composite structure and in use of the composite structure. For example, in RAM applications when the interlayer includes a carbon cloth, it is undesirable to penetrate the carbon cloth because that would adversely affect its performance as a RAM reflector. Also, if optical fibres are included in the interlayer region, these must remain intact so that that they can perform their function.

To meet these challenges, a second aspect of the present invention resides in a core for a composite structure, the core comprising: a first core layer; a second core layer; and an interlayer region between the first and second core layers; wherein at least one of the first and second core layers has hinge portions that do not interrupt the interlayer region.

The hinge portions facilitate draping of the core whilst maintaining the continuity of the interlayer region and of any materials disposed in the interlayer region. This is important for RAM applications because disrupting the continuity of a carbon cloth layer would adversely affect its RAM performance. This is also important when optical fibres are disposed in the interlayer region because the continuity of the optical fibres must be maintained so that they may perform their function.

The hinge portions are a means of articulation that enhance the flexibility of the first and second core layers. The hinge portions may comprise lines of weakness or locally-thinned portions in the core layers. For example, the hinge portions may be defined by drape-promoting formations such as discontinuities, grooves, channels, slits or slots in the core layers. The hinge portions function as joints.

In preferred embodiments of the invention, slits are provided in the core layers to facilitate draping. The slits may be provided with or without removal of material from the core layers. A first plurality of slits may be provided in the first core layer and a second plurality of slits may be provided in the second core layer. The first plurality of slits may each extend into the first core layer to a depth not exceeding the thickness of the first core layer. Similarly, the second plurality of slits may each extend into the second core layer to a depth not exceeding the thickness of the second core layer. Preferably the first plurality of slits each extend into the first core layer to a depth that is less than the thickness of the first core layer. It is also preferred that the second plurality of slits each extend into the second core layer to a depth that is less than the thickness of the second core layer.

Thus, the first and second plurality of slits do not cross the interlayer region. Consequently, the core slitting scheme facilitates draping of the core whilst maintaining the continuity of the interlayer region.

Functionality may be embedded within the core. For example, the interlayer region may comprise optical fibres and/or a RAM reflecting interlayer such as carbon tissue. Conveniently, any such embedded functionality is protected by the first and second core layers. The core layers are preferably formed from a lightweight material. Suitable materials include open or closed cell structured foam, syntactic foam, balsa wood, composite honeycomb. The core is preferably of unitary construction.

The draping scheme is also advantageous for non-functional applications, i.e. in which the interlayer region does not include functionality such as a carbon cloth or optical fibres. For example, the core may be a bonded core in which first and second core layers are bonded together by an adhesive provided in the interlayer region—i.e. an "adhesive interlayer". Bonded cores are generally stronger than single layer cores of equivalent thickness, and the draping scheme facilitates draping without penetrating or otherwise disrupting the continuity of the adhesive interlayer. Consequently, draping is facilitated in the bonded core without reducing the bond area or reducing the bond strength between the core layers.

In the following description, the terms "innermost" and "outermost" will be used to refer to regions of the core layers in terms of their relative dispositions with respect to a radius of draping curvature. It will become clear that a given core layer, for example the first core layer, can be both innermost and outermost in different regions of a composite structure in accordance with the local curvature of the composite structure.

When a core is draped in a mould during composite lay-up, one of the core layers becomes innermost with respect to a radius of draping curvature and the other core layer becomes outermost with respect to that radius of draping curvature. For example, if the second layer is innermost with respect to a radius of draping curvature in a convex-curved region of the mould, then the first layer will be outermost with respect to that radius of draping curvature; it follows then that the first layer will be innermost with respect to a radius of draping curvature in a concave-curved region of the mould, and the second layer will be outermost with respect to that radius of draping curvature.

The curvature of a composite structure may vary across the structure. Indeed, the curvature may switch between concave and convex moving across the structure; this is true of modern wind turbine blades. Therefore, as mentioned above, a core layer may be innermost with respect to a radius of draping curvature in one region of a structure and outermost with respect to a radius of draping curvature in another region of the structure.

The hinge portions in the core layers may be suitably configured to obtain the required level of drape for a given core thickness as described by way of example below. In this respect, references to "low drape" are to situations where a radius of draping curvature is relatively large; and references to "high drape" are to situations where a radius of draping curvature is relatively small.

For low drape, the width and separation of the hinge portions in the first core layer may be similar to the width and separation of the hinge portions in the second core layer. Higher levels of draping may be achieved by increasing the flexibility of the core layers and/or by increasing the ability of the core to shorten and/or lengthen to achieve a given radius of curvature. To this end, the size of the drape-promoting formations in a region of a core layer may be increased. When the drape-promoting formations are in the form of slits, the slits may be widened to increase their size.

If the thickness of an innermost region of a core layer is increased, then it may be necessary to increase the size of the drape-promoting formations in that region of the core layer in order to achieve a required level of draping.

Generally speaking, it is desirable to increase the separation between drape-promoting formations when increasing the size of the formations so that there is sufficient core material in a core layer to achieve the structural objectives of the core.

Drape-promoting formations in the core layers may have a V-shaped cross section (otherwise referred to herein as a "V-section") or a cross-section that otherwise tapers inwards towards the interlayer region. This may be desirable for preventing excessive resin ingress for a given drapability. For example, the movement capability of a hinge portion defined by a V-section slit is similar to the movement capability of a hinge portion defined by a parallel-sided slit having a slit opening of equivalent size. However, the volume of the V-section slit will be lower than the parallel-sided slit and so resin ingress is lower in the V-shaped slit whilst drapability of the core is similar.

V-section drape-promoting formations or formations that otherwise taper towards the interlayer region may also be desirable in regions of a core layer that, when draped, will be innermost with respect to the radius of draping curvature; this is to prevent the drape-promoting formations in these parts from closing up and hence tending to block further curvature when the core is draped. However, if such shaped formations are provided in outermost regions of a core layer, then these formations may widen undesirably when the core is draped.

Accordingly, it may be desirable to have drape-promoting formations of varying profiles across a given core layer. For example, V-section or otherwise suitably-tapered drape-promoting formations could be provided in regions of a core layer that will be innermost when draped, whilst non-tapered formations could be provided in regions of that same core layer that will be outermost when draped.

From the examples above, it will be apparent that the drape-promoting formations in the first core layer may be different from the drape-promoting formations in the second core layer and/or the configuration of the drape-promoting formations in the first core layer may be different from the configuration of the drape-promoting formations in the second core layer. For example, one core layer may have V-section drape-promoting formations and the other core layer may have parallel-sided drape-promoting formations.

It will also be apparent that the drape-promoting formations may vary in type and/or configuration across the first and/or the second core layer. For example, at least one core layer may have regions that include V-section drape-promoting formations, and regions that include parallel-section drape-promoting formations.

The core may be of unitary construction, and may be in the form of discrete panels or sheets. The edges of the panels or sheets may be chamfered to provide chamfered joints between panels. Benefits of the chamfered edges are particularly acute when there is high drape.

Parallel drape-promoting formations may be provided in the core layers to facilitate draping in a single direction. Alternatively, the drape-promoting formations may intersect with one another, for example in a criss-cross pattern, to facilitate draping in more than one direction.

It will be appreciated that preferred and/or optional features of the second aspect of the invention are equally applicable to the first aspect of the invention and vice versa. In particular, the draping scheme described above in relation to the second aspect of the invention may be applied to facilitate draping in the cores described in relation to the first aspect of the invention.

BRIEF DESCRIPTION OF THE DRAWINGS

Reference has already been made to FIGS. 1a and 1b of the accompanying drawings in which.

Figures 2A, 2B:
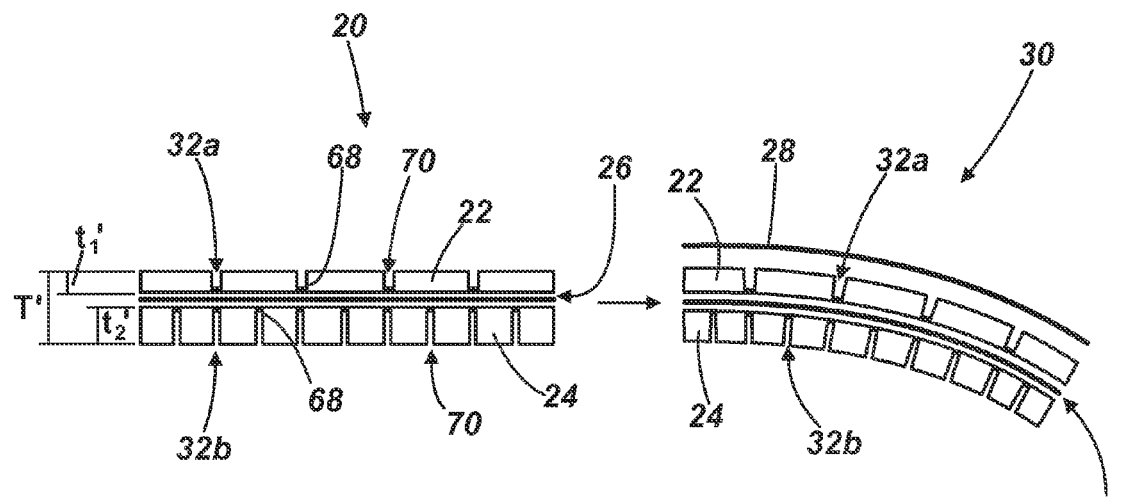
Figures 3A, 3B:
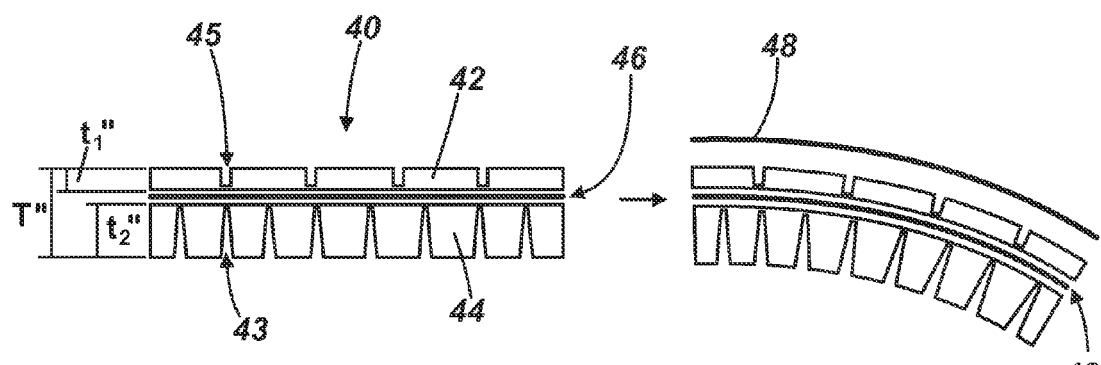
Figure 5:
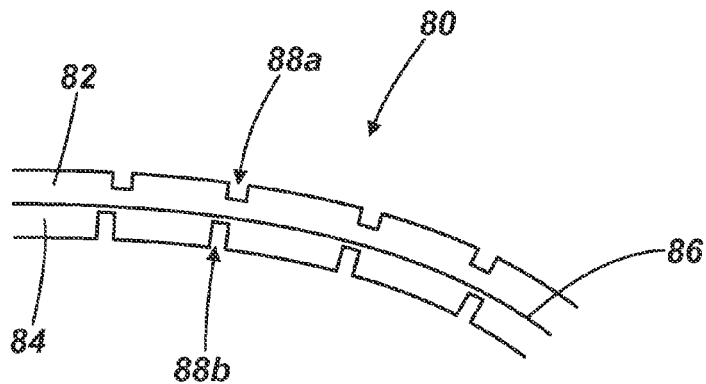
Figures 6A, 6B:
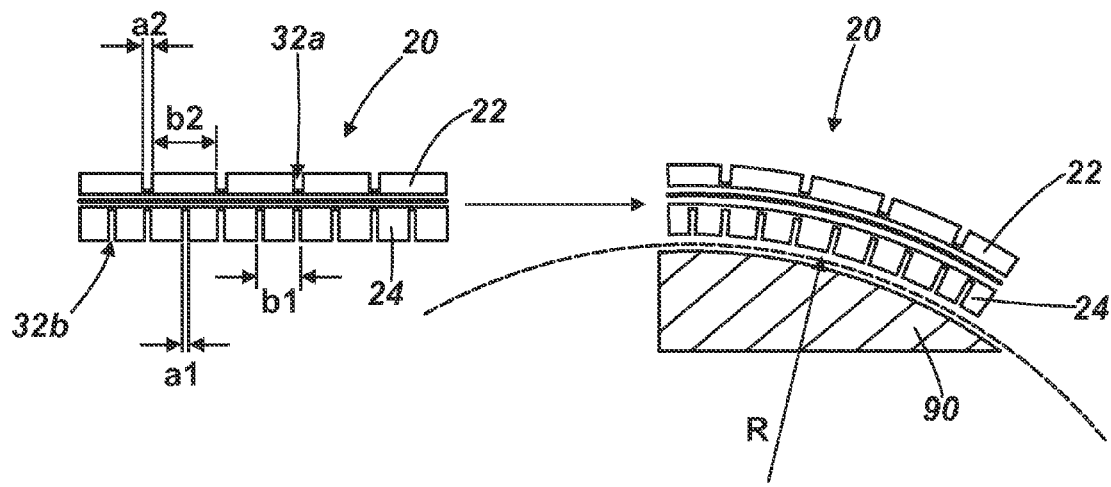

In order that the invention may be more readily understood, reference will now be made, by way of example, to FIGS. 2 to 6, in which:

FIG. 2a is a schematic cross-sectional side view of a split core comprising first and second core layers each provided with slits to facilitate draping of the split core during fabrication of a composite structure as shown in FIG. 2b, wherein a functional interlayer is shown between the first and second core layers;

FIG. 2b is a schematic cross-sectional side view of a composite structure such as a wind turbine blade, in which the split core of FIG. 2a is shown in a draped configuration and disposed inboard of a functional layer of the composite structure;

FIG. 3a is a schematic cross-sectional side view of a split core similar to the split core of FIG. 2a, but having a thicker second core layer;

FIG. 3b is a schematic cross-sectional side view of a composite structure such as a wind turbine blade, in which the split core of FIG. 3a is shown in a draped configuration and disposed inboard of a functional layer of the composite structure;

FIG. 4a is a schematic cross-sectional side view of a wind turbine blade of sandwich panel construction and comprising a split core;

FIG. 4b is an enlarged schematic cross-sectional side view of the blade of FIG. 4a in a region close to a rotor hub, in which region the split core has a relatively thick second core layer;

FIG. 4c is an enlarged schematic cross-sectional side view of the blade of FIG. 4a in a region close to the blade tip, in which region the split core has a relatively thin second core layer;

FIG. 5 is a schematic cross-sectional side view of a bonded core comprising first and second core layers joined together by an adhesive interlayer, the first and second core layers each comprising a plurality of slits to facilitate draping;

FIG. 6a is a schematic cross-sectional side view of a split core similar to the split core of FIG. 2a, including labels denoting width of slits and separations between slits; and FIG. 6b is a schematic cross-sectional side view of the split core of FIG. 6a, in which the split core is draped in a convex-curved region of a mould, and in which a radius of draping curvature is shown.

DETAILED DESCRIPTION

FIG. 2a shows a split core 20 for use in the construction of composite structures such as wind turbine blades. Referring to FIG. 2a, the split core 20 is of unitary construction and comprises a first core layer 22 and a second core layer 24, each of lightweight core material, for example foam. A functional interlayer 26 is disposed between the first and second core layers 22, 24. The three layers 22, 24, 26 are bonded together by a suitable adhesive such that the functional interlayer 26 is embedded within the resulting core 20. In this example, the functional interlayer 26 is a carbon cloth layer, which functions as a back reflector for radar, and is hereinafter referred to as a "RAM reflector layer".

As shown in FIG. 2b and described in more detail later, the split core 20 is adapted to drape in order to conform to the required curvature of the composite structure in which it is incorporated. That curvature is defined by the curvature of a mould (not shown) in which the split core 20 is laid up during fabrication of the composite structure. Referring to FIG. 2b, the split core 20 is shown disposed inboard of a functional layer 28 of a composite structure 30, for example a wind turbine blade. In this example, the functional layer 28 is a radar absorbing layer, referred to hereinafter as a "RAM absorber layer". The RAM absorber layer 28 comprises a circuit provided on a layer of plain weave E-glass. The RAM absorber layer 28 is disposed close to an external surface (not shown) of the composite structure 30.

As described by way of background to the invention, the relative separation between the RAM absorber layer 28 and the RAM reflector layer 26 is a key design parameter and affects RAM performance. In this example, the relative separation between the RAM absorber layer 28 and the RAM reflector layer 26 is determined by the thickness of the first core layer 22, which separates these two layers in the composite structure 30. For a given design of RAM absorber layer 28, consistent RAM performance is achieved by ensuring that the first core layer 22 is of substantially uniform thickness across the composite structure 30.

It will be noted that the split core 20 in FIG. 2b is draped. Slits 32a, 32b are provided in the first and second core layers 22, 24 to promote draping in a way that is described later with reference to FIGS. 6a and 6b.

Ignoring the generally minimal thickness of the RAM reflector layer 26, the total thickness (T') of the split core 20 is the sum of the thickness of the first core layer 22 ($t_1'$) and the thickness of the second core layer 24 ($t_2'$); i.e. $T'=t_1'+t_2'$.

Referring now to FIG. 3a, there is shown a split core 40 of unitary construction and comprising a first core layer 42, a second core layer 44 and a functional interlayer 46 in the form of a RAM reflecting layer disposed between the first and second core layers 42, 44. The thickness of the first core layer 42 ($t_1''$) is identical to the thickness of the first core layer 22 ($t_1'$) of the split core 20 of FIG. 2. However, the thickness of the second core layer 44 ($t_2''$) is greater than the thickness of the second core layer 24 ($t_2'$) of the split core 20 of FIG. 2. Hence, the total thickness (T'') of the split core 40 of FIG. 3 is greater than the total thickness (T') of the split core 20 of FIG. 2.

A comparison of FIGS. 2 and 3 shows that the total thickness T of the split cores 20, 40 can be varied by varying just the thickness $t_2$ of the second core layer 24, 44; the thickness $t_1$ of the first core layer 22, 42 can remain the same irrespective of the total core thickness T. The split core design therefore allows the total core thickness T to vary without affecting the separation between the RAM reflector layer 26, 46 and the RAM absorber layer 28, 48, which is determined by the thickness $t_1$ of the first core layer 24, 44. Consequently, design of a uniform RAM solution is simplified irrespective of the total thickness T. This is in contrast to the prior art shown in FIG. 1b, which requires a different RAM absorber design for each core thickness. The split core 20, 40 of the present invention reduces lay-up complexity, facilitates stock control and eliminates the risk of using an incorrect RAM cloth in a given region of the composite structure.

A wind turbine blade 50 of sandwich panel construction comprising a split core 52 substantially as described above is shown schematically in FIG. 4a. The blade 50 extends from a root end 54 connected to a rotor hub 56, to a tip end 58. As shown in FIGS. 4b and 4c, the split core 52 has a first core layer 60, a second core layer 62 and a radar reflecting interlayer 64 disposed between the first and second core layers 62, 64. A radar absorbing layer 66 is disposed close to the outer surface 68 of the blade 50.

There is a need for greater structural strength at the root end 54 than at the tip end 58. Consequently, the core 52 is thicker at the root end 54 (FIG. 4b) than at the tip end 58 (FIG. 4c). Referring to FIGS. 4b and 4c, the second core layer 62 is relatively thick (e.g. about 30 mm) in a region close to the root end 54 (FIG. 4b) and relatively thin (e.g. about 5 mm) in a region close to the tip end 58 (FIG. 4c). However, the first core layer 60 has the same thickness (e.g. about 10 mm) in both regions (FIG. 4b and FIG. 4c). Therefore, the separation between the RAM absorber layer 66 and the RAM reflector layer 64 is the same in both regions of the blade 50. This facilitates uniform RAM properties across both regions. Indeed, design of a RAM absorber for use in different regions of the blade 50 of different total core thickness is simplified, provided that the thickness of the first core layer 60 in these regions is the same. Extending this idea, a single design of RAM cloth can be used across the entire blade 50, provided that the first core layer 60 is of substantially uniform thickness across the blade 50.

It will also be noted that there is relatively high drape toward the root end 54 of the wind turbine blade 50, and relatively low drape toward the tip end 58. To suit these characteristics, the slits in the second core layer 62 differ from one location to the next, whilst the slit configuration of the first core layer 60 remains the same. Specifically, where the second core layer 62 is relatively thick in the high drape region near the root end 54, the slits are relatively wide and are spaced further apart than in the relatively thin second core layer 62 near the tip end 58. The preferred relationship between core layer thickness, slit width and slit spacing is described in more detail below with reference to FIGS. 6a and 6b.

An additional benefit of the split core design is that the embedded RAM reflector layer 26, 46, 64 is protected on both sides by the first and second core layers respectively. In further examples of the invention, which are not shown in the figures, other materials may be embedded in the core 20, 40, 52. For example, optical fibres may be included in the region between the first and second core layers (also referred to herein as the "interlayer region"). In the context of wind turbine blades, the optical fibres may be utilised in measuring loads experienced at various locations in the blades. Advantageously, the optical fibres would be protected by the split core construction.

Figures 1A, 1B:
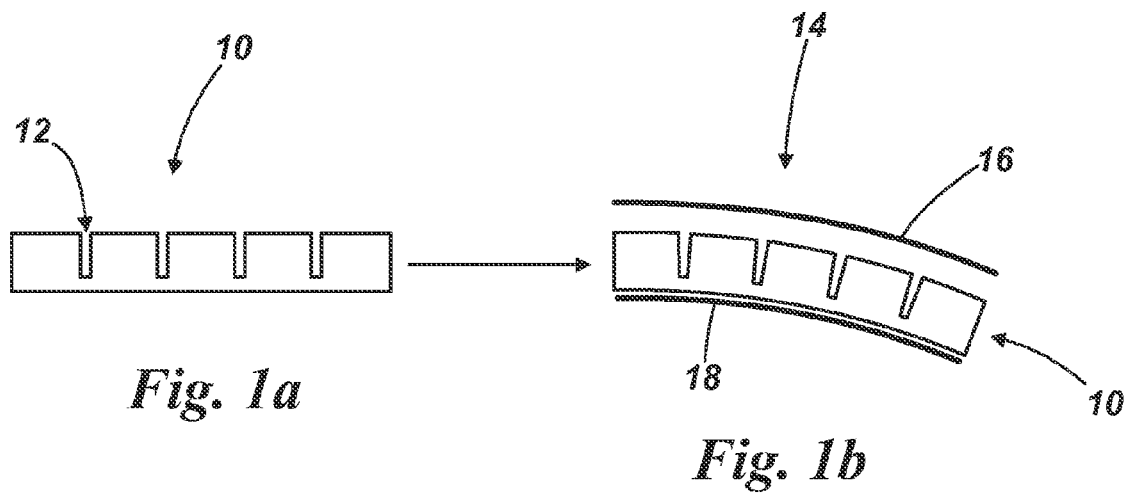
FIG. 1a is a schematic cross-sectional side view of a prior art foam core provided with slits to facilitate draping.
FIG. 1b is a schematic cross-sectional side view of the foam core of FIG. 1a draped between RAM absorber and reflector layers in a wind turbine blade.

Referring back to the prior art core 10 shown in FIG. 1b, draping is facilitated by the slits 12 that extend through the majority of the thickness of the core 10. If this draping scheme was applied to the split core construction of FIGS. 2 to 4, then the slits would extend through the carbon cloth 26, 46, 64 and would disrupt its performance as a RAM reflector. Therefore, an alternative scheme has been developed for facilitating draping of the split core 20, 40, 52 without disrupting the continuity of the interlayer. The alternative draping scheme is described below with reference to FIGS. 2, 3, 5 and 6.

Referring back to FIG. 2, a plurality of hinge portions 68 are provided in the first and second core layers 22, 24. The hinge portions 68 are defined by drape-promoting formations 70 in the form of slits 32a, 32b; specifically, each hinge portion 68 lies directly underneath a respective slit 32a, 32b. A first plurality of slits 32a is provided in the first core layer 22, and a second plurality of slits 32b is provided in the second core layer 24. So as not to disrupt the continuity of the interlayer 26, the slits 32a, 32b stop short of the interlayer 26; expressed in other words, the first plurality of slits 32a each extend into the first core layer 22 to a depth that is less than the thickness $t_1$ (FIG. 2) of the first core layer 22, and the second plurality of slits 32b each extend into the second core layer 24 to a depth that is less than the thickness $t_2$ (FIG. 2) of the second core layer 24. This configuration of slits facilitates draping without slitting the RAM reflector layer 26, which would disrupt its RAM performance.

The draping scheme described above is also advantageous for non-functional applications, i.e. in which the interlayer does not comprise functionality such as a carbon cloth or optical fibres. For example, the draping scheme may be used in bonded cores, in order to facilitate draping without cutting through an adhesive layer(s) between the core layers, and hence without reducing the bond area or reducing the bond strength between the core layers. Bonded cores are generally stronger than single layer cores of equivalent thickness.

An example of a bonded core 80 is shown in FIG. 5. Referring to FIG. 5, the bonded core 80 comprises a first core layer 82 and a second core layer 84 bonded together by an adhesive interlayer 86. To facilitate draping, the first core layer 82 includes a first plurality of slits 88a and the second core layer 84 comprises a second plurality of slits 88b. The first plurality of slits 88a each extend into the first core layer 82 to a depth that is less than the thickness of the first core layer 82, whilst the second plurality of slits 88b each extend into the second core layer 84 to a depth that is less than the thickness of the second core layer 84. This configuration of slits facilities draping without disrupting the adhesive interlayer 86 and weakening the bond between the core layers 82, 84.

As described in further detail below with reference to FIGS. 6a and 6b, the draping scheme for the split cores 20, 40, 52, 80 described above brings with it further challenges in achieving the required levels of draping to accommodate varying curvature in a composite structure, for example convex and concave curvature of varying degrees.

Referring first to FIG. 6b, when draped in a mould 90, the split core 20 curves to conform to the curvature of the mould 90. A convex-curved region of the mould 90 is shown in FIG. 6b. The split core 20 has a radius of curvature denoted by the letter "R", and hereinafter referred to as a radius of "draping curvature". In FIG. 6b, the second core layer 24 in the convex-curved region of the mould 90 is hereinafter referred to as "innermost" with respect to the radius of draping curvature R, whilst the first core layer 22 in this region is hereinafter referred to as "outermost" with respect to this radius of draping curvature R.

It will be appreciated that in regions of the mould having concave-curvature, the second core layer 24 would be outermost with respect to a radius of draping curvature, whilst the first core layer 22 would be innermost with respect to that radius of draping curvature.

Referring to FIG. 6a: the width of the slits 32b in the innermost core layer 24 is denoted by a1; the width of the slits 32a in the outermost core layer 22 is denoted by a2; the separation between adjacent slits 32b in the innermost core layer 24 is denoted by b1; and the separation between adjacent slits 32a in the outermost core layer 22 is denoted by b2.

Referring again to FIG. 6b, for a given configuration of slits 32a in the outermost core layer 22 (e.g. for a given a2 and b2), the configuration of slits 32b in the innermost core layer 24 (e.g. a1 and b1) will depend on the thickness of the innermost core layer 24 and the required level of drape. For example, if low drape is required, then the width and separation of the second plurality of slits 32b may be similar to the width and separation of the first plurality of slits 32a (i.e. a2 and b2 may be similar to a1 and b1); this is assuming that the slits 32a are configured for low drape.

For higher levels of drape (again for a given configuration of slits 32a in the outermost core layer 22), the slits 32b in the innermost core layer 24 may be widened (i.e. a1 may be increased). In order that the innermost core layer 24 contains sufficient core material, widening the slits 32b in the innermost core layer 24 may in turn require that the separation between these slits is increased (i.e. increasing a1 may in turn require that b1 is increased).

Generally speaking, for a given configuration of slits 32a in the outermost core layer 22, a given slit depth in the innermost core layer 24, and a given level of draping, wider slits 32b will be required in the innermost core layer 24 as the thickness of that layer increases in order to prevent those slits 32b from closing up and hindering draping.

There are other ways to prevent the slits 32b from closing up when the split core is draped. It is not essential that the slits have parallel sides. For example, referring back to FIGS. 3a and 3b, the split core 40 has V-section slits 43 in part of the second core layer 44 that is innermost with respect to a radius of draping curvature when the split core 40 is draped (FIG. 3b). V-section slits provide similar flexibility to parallel-sided slits that have a slit opening of comparable width. However, V-section slits have a smaller volume than such parallel-sided slits, which leads to reduced resin ingress during composite fabrication. Consequently, if V-section slits are employed, wider slits can be used without causing excessive resin ingress; wider slits allow the innermost core layer 44 to compress more and hence facilitate increased levels of draping.

V-section slits may widen excessively if they are provided in parts of a core layer that are outermost when draped. For this reason, parallel-sided slits 45 are provided in the outermost core layer 42 of the split core 40 of FIGS. 3a and 3b.

The split cores 20, 40, 52, 80 may be formed as discrete panels. The panels may be provided with chamfered edges to increase drape.

Whilst parallel slits are shown in the drawings, it will be appreciated that other configurations of slits are possible to achieve draping in more than one plane; for example intersecting slits (e.g. criss-cross slits in a grid formation) could be employed to facilitate draping in two senses. It will be appreciated that slits are not essential for promoting draping. Instead, the core layers may have other suitable drape-promoting formations such as discontinuities, grooves, channels, or slots.

It is possible to vary the type of drape-promoting formations along a given core layer. For example, a core layer may have V-shaped slits in regions that will be innermost with respect to a local radius of draping curvature when the core is draped, and parallel-sided slits in regions that will be outermost with respect to other local radii of draping curvature when the core is draped. Various other modifications may be made to the examples described above without departing from the scope of the invention as defined by the following claims.

The invention claimed is:

1. A composite structure comprising a functional layer and a core, the core comprising:
    a first core layer;
    a second core layer; and
    a functional interlayer disposed between the first and second core layers; wherein the first core layer is disposed between the functional layer and the functional interlayer; the thickness of the first core layer is substantially uniform across the composite structure; and the distance between the functional layer and the functional interlayer is substantially constant across the composite structure; and further wherein the thickness of the second core layer varies across the composite structure to vary the overall thickness of the core, and further wherein the functional layer of the composite structure includes radar absorbing material.

2. The composite structure as claimed in claim 1, wherein the radar absorbing material comprises circuitry on a woven cloth substrate.

3. The composite structure as claimed claim 1, wherein the composite structure is of sandwich panel construction.

4. The composite structure as claimed in claim 1, wherein the composite structure is a section of a wind turbine blade.

5. A wind turbine having a blade comprising the composite structure of claim 3, or a wind farm comprising at least one such wind turbine.

6. A composite structure comprising an outer surface and a core, the core comprising:
    a first core layer;
    a second core layer; and
    a functional interlayer disposed between the first and second core layers; wherein the first core layer is disposed between the outer surface and the functional interlayer; the thickness of the first core layer is substantially uniform across the composite structure; and the depth of the functional interlayer with respect to the outer surface is substantially constant across the composite structure, and further wherein the thickness of the second core layer varies across the composite structure to vary the overall thickness of the core, and further wherein the functional interlayer includes a radar reflecting layer.

7. The composite structure as claimed in claim 6, wherein the composite structure is of sandwich panel construction.

8. The composite structure as claimed in claim 6, wherein the composite structure is a section of a wind turbine blade.

9. A wind turbine having a blade comprising the composite structure of claim 7, or a wind farm comprising at least one such wind turbine.

10. The composite structure as claimed in claim 6, wherein the radar reflecting layer includes a layer of carbon tissue.

11. A composite structure comprising a functional layer and a core, the core comprising:
    a first core layer;
    a second core layer; and
    a functional interlayer disposed between the first and second core layers; wherein the first core layer is disposed between the functional layer and the functional interlayer; the thickness of the first core layer is substantially uniform across the composite structure; and the distance between the functional layer and the functional interlayer is substantially constant across the composite structure; and further wherein the thickness of the second core layer varies across the composite structure to vary the overall thickness of the core, and further wherein the composite structure is a section of a wind turbine blade.

12. a composite structure comprising a functional layer and a core, the core comprising:
    a first core layer;
    a second core layer; and
    a functional interlayer disposed between the first and second core layer; wherein the first core layer is disposed between the functional layer and the functional interlayer; the thickness of the first core layer is substantially uniform across the composite structure; and the distance between the functional layer and the functional interlayer is substantially constant across the composite structure; and further wherein the thickness of the second core layer varies across the composite structure to vary the overall thickness of the core, and further wherein the functional interlayer includes a radar reflecting layer.

13. The composite structure as claimed in claim 12, wherein the radar reflecting layer includes a layer of carbon tissue.

* * * * *